H. A. KOLLENBERG.
SEED PLANTER.
APPLICATION FILED AUG. 12, 1915.
1,182,913.
Patented May 16, 1916.
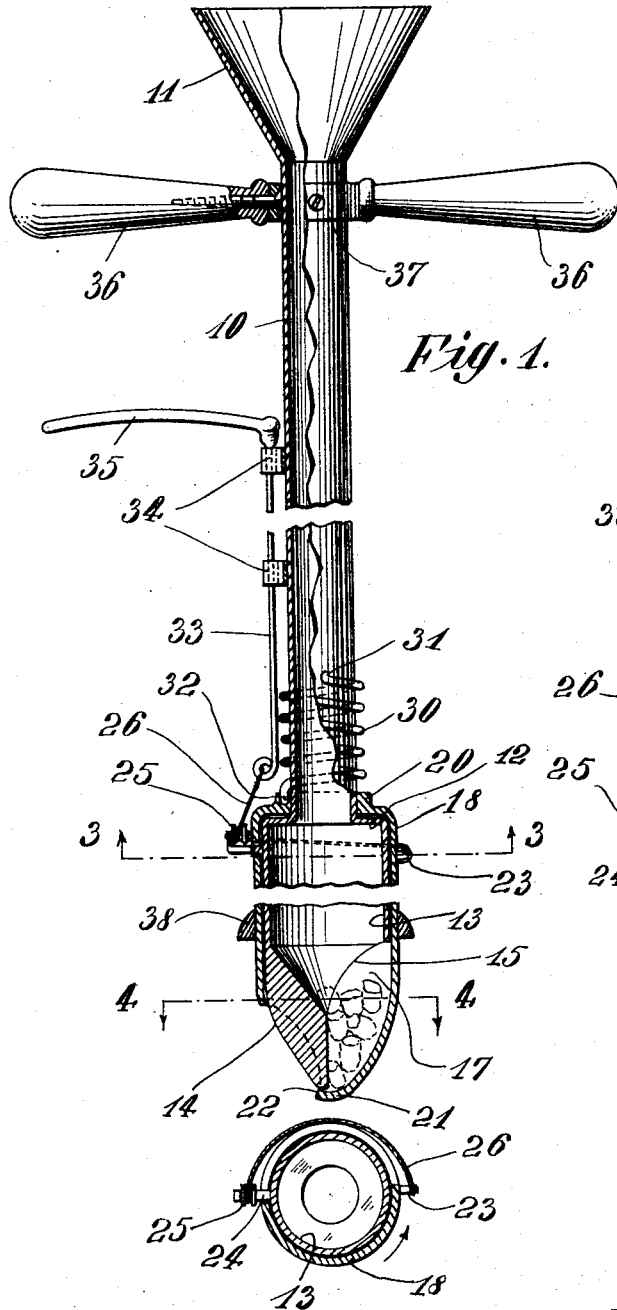
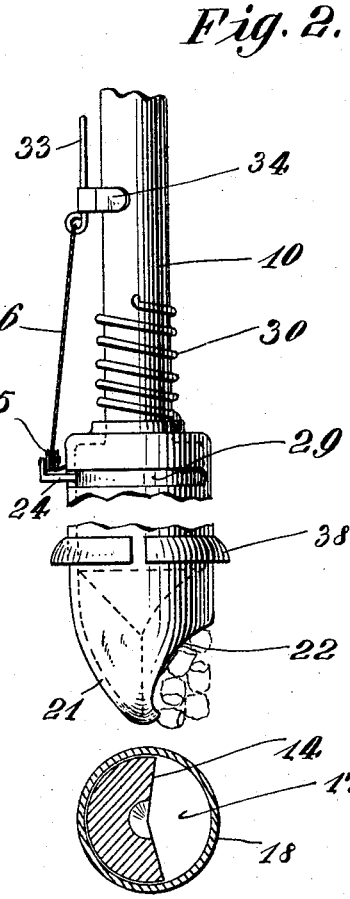
WITNESSES:
INVENTOR
Hermann A. Kollenberg.
BY
his ATTORNEY

UNITED STATES PATENT OFFICE.

HERMANN A. KOLLENBERG, OF HOBOKEN, NEW JERSEY.

SEED-PLANTER.

1,182,913. Specification of Letters Patent. Patented May 16, 1916.

Application filed August 12, 1915. Serial No. 45,125.

*To all whom it may concern:*

Be it known that I, HERMANN A. KOLLENBERG, a subject of the Emperor of Germany, residing at 205 Bloomfield street, Hoboken, in the county of Hudson and State of New Jersey, have invented new and useful Improvements in Seed-Planters, of which the following is a specification.

This invention relates to improvements in seed planters and has for its objects the provision of an apparatus whereby seeds of various kinds may be sown at will within the soil in a positive and rapid manner.

A second object is to provide an apparatus of great simplicity, that can be operated without previous experience and which can be constructed at a minimum of cost.

These and other objects are attained by the novel construction and combination of parts hereinafter described and shown in the accompanying drawings, forming part of this specification but from which modifications may be made within the scope of the claims hereto appended.

In the drawings:—Figure 1 is a partial, elevational, sectional view of a seed planter made in accordance with the invention, shown closed. Fig. 2 is a side elevation of the lower part of the same, shown open or in position for distributing the seeds. Fig. 3 is a transverse section, taken on line 3—3 of Fig. 1, and, Fig. 4 is a similar sectional view taken on line 4—4 of Fig. 1.

The invention comprises a rigid tubular body 10, having an open funnel 11 at its extreme upper end, and flanged outwardly at the bottom 12, where it is connected with a cylindrical chamber 13. The lower end of the chamber 13 is formed conically, as at 14, and curved as shown, a part being removed, as at 17, through which the seed is permitted to pass until contact is made by it with the rotatable cylindrical casing 18. This casing is supported on the tube 10, by means of a hub 20, resting upon the flange 12; its lower end 21 is formed conically and provided with an opening 22 through which the seed may be dispensed when brought into registration with the space 17. Attached to the chamber 13 is a bracket 24, carrying a pulley 25, over which runs a cable 26, one end of which is attached to the loop 23 secured on the casing 18, in such manner that when the cable is pulled the casing 18 is caused to rotate, a slot 29 being provided through which the bracket 24 extends. A spring 30, having one end 31 fast on the tube 10, has its other end 32, engaged with the casing so as to return the same to its initial position when the cable 26 is released. The other end of the cable is connected with the rod 33, slidable in brackets 34 attached to the exterior of the tube at its upper end and provided with the handle 35 by means of which it can be raised or lowered.

The apparatus is operated by means of one or two handles, as 36, secured to the upper end of the tube 10, by the band 37 in such position as to be readily grasped by the hands of an operator when using the apparatus.

In order to limit the depth that the apparatus may enter the soil, a spring band or collar 38 is mounted on the exterior of the casing 18 and may be adjusted as to distance from the point 21 as required.

In operation the tube is filled with a quantity of the seed through the open funnel 11 in such quantity as may be desired or the apparatus capable of receiving. By inserting the conical end 21 within the ground, which has been previously prepared by usual agricultural methods, and to the depth desired, the handle 35 is raised adjacent to the main handles 36, which can be readily done by one hand of the operator, a predetermined quantity of the seed is entered into the funnel 11 and the space 17 and from thence into the soil through the opening 22; upon releasing the lever 35, the spring 30 automatically causes the casing 18 to turn closing the opening and the implement may then be raised by the handles 36 and re-set in the next adjacent hill or row where it is desired plants to grow.

Having thus described my invention what I claim as new and desire to secure by Letters Patent, is:—

1. In a seed planter, a tubular body, operative handles combined therewith, a chamber formed at the lower end of said body having an opening therein, a casing normally surrounding said chamber having an opening registrable with the opening in said chamber, and means for rotating said casing.

2. In a seed planter, the combination with a rigid tube having an enlarged base, a conical end formed with said base and containing a dispensing opening, a sleeve suited to said base, also having an opening, means for rotating said sleeve whereby registration of said openings may be effected and means for automatically returning said sleeve to its original position upon the release of said rotating means.

3. In a seed planter, a rigid tubular body having an enlarged hollow base adapted to contain seed, operative handles combined therewith, a casing surrounding said base, there being a pocket formed in said base said casing having an opening registrable with said pocket, means for semi-rotating said casing whereby the pocket may be emptied through the mentioned opening, means for retracting said casing and means for adjustably limiting the depth the planter can be inserted into the soil.

In testimony whereof I have signed my name to this specification.

HERMANN A. KOLLENBERG.

Copies of this patent may be obtained for five cents each, by addressing the "Commissioner of Patents, Washington, D. C."